United States Patent Office 3,442,772
Patented May 6, 1969

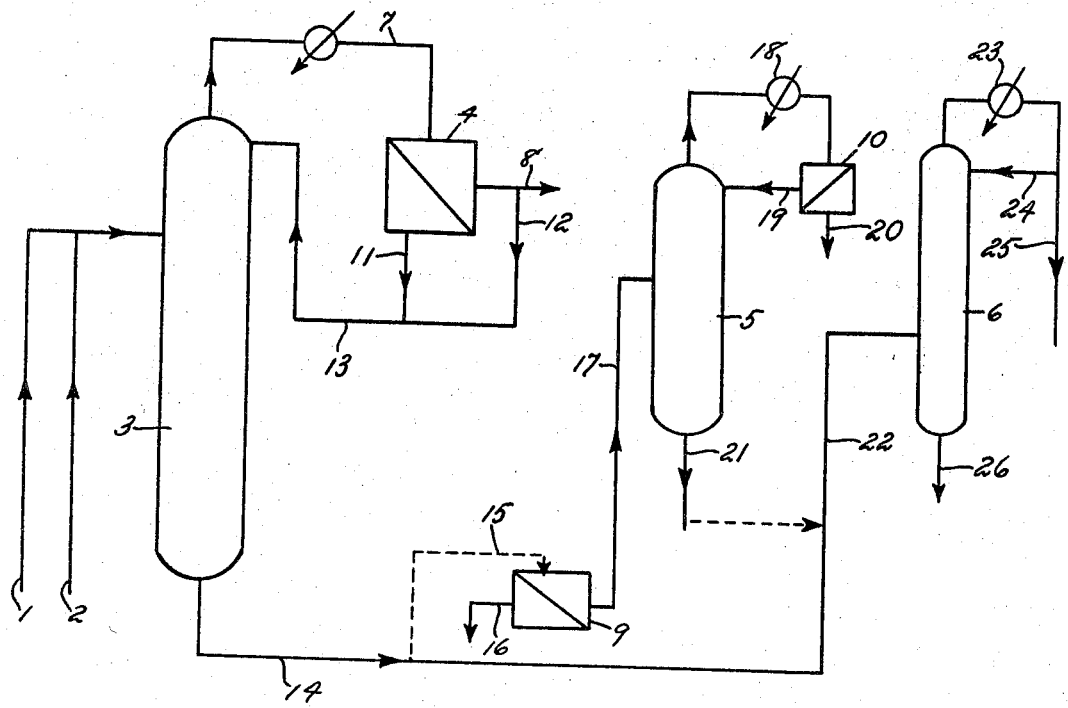

3,442,772
METHOD OF PURIFYING METHYL-ISOBUTYL-CARBINOL BY AZEOTROPIC DISTILLATION WITH WATER
Shiro Kudo and Shinichi Tsurugi, Osaka-fu, Japan, assignors to Kyowa Hakko Kogyo Kabushiki Kaisha, Tokyo-to, Japan, a corporation of Japan
Filed July 19, 1966, Ser. No. 566,267
Claims priority, application Japan, July 27, 1965, 40/45,076
Int. Cl. B01d 3/38, 3/36
U.S. Cl. 203—85     11 Claims The present invention relates to a method of purifying methyl-isobutylcarbinol from a stream of methyl-isobutylcarbinol and mesityl oxide by means of azeotropic distillation using water.

Methyl-isobutylcarbinol (hereinafter referred to in the specification as MIBC) and methyl-isobutylketone (hereinafter referred to as MIBK) are both produced by hydrogenation of mesityl oxide (hereinafter referred to as MO). The hydrogenation of mesityl oxide to produce the corresponding ketone and carbinol compounds is a well known chemical reaction and need not be further described. The resultant effluent stream of this hydrogenation, however, contains a combination of MIBK, MIBC and unreacted MO. Since the boiling points of MIBK, MO and MIBC are respectively 116, 129.5 and 131.6° C., substantial difficulty has been encountered in recovering a highly purified MIBC product. In particular, great difficulty has been encountered in separating the MO and MIBC components due to their close boiling point. In the past considerable difficulty was encountered in obtaining highly purified MIBC from such a mixture after removing the MIBK components with conventional distillation techniques. For example, when a mixture of 95% MIBC and 5% MO is distilled at reflux ratios of 80 by means of a distillation column having as many as 80 effective plates, a solution comprising 20% MO and 80% MIBC is recovered from the top of the columns, while the stream removed from the bottom of the column rich in MIBC still nevertheless contains 2.7% MO, i.e. a high proportion of impurity. Since it is desired to obtain MIBC product of 99+% purity, it is readily observed that these techniques have not proven satisfactory. In an effort to obtain highly pure MIBC, it has heretofore been proposed to carry out, for example, the additional hydrogenation reaction under high pressure to convert the residual MO into MIBC so as to obtain a highly purified MIBC. This technique requires additional procedures and is of limited practicality.

In accordance with the present invention, means are taught whereby a highly purified MIBC product can be recovered from a stream containing MIBC and MO by relatively simple and effective techniques. More particularly water is added to a distillation stage treating a mixture of MIBC and MO, the water serving to selectively separate the two components so that the MO is selectively removed overhead whereas a stream rich in MIBC is withdrawn as bottoms.

The amount of water which is added to the mixture of MIBC and MO undergoing distillation may vary widely. In general, it may range from 0.25 to 50 weight parts per 100 weight parts of mixture of MIBC and MO. The ratio generally falls in the range of 0.5 to 30 parts of water per 100 parts of MIBC/MO mixture.

When employing the relatively low ratios of water in the distillation step, the aqueous distillation step will directly produce a stream quite rich in MIBC which need then, if desired, only to be treated to remove high boiling substances. When larger ratios of water are employed the aqueous distillation step may be combined with an intermediate de-hydration treatment to treat the bottoms from the aqueous distillation step which contain a relatively high proportion of water. The effluent of the dehydration step may then be treated to remove high boiling components much in the same manner as is employed directly with respect to the systems utilizing relatively low ratios of water in the aqueous distillation step.

In accordance with the present invention a mixture of MIBC and MO such as is recovered from the hydrogenation of mesityl oxide is charged onto the top portion of a distillation column; either as a separate stream or in admixture with the MIBC and MO water is also charged onto the column. The vapor distilled from the top of the column is condensed in a condenser and sent to a decanter. The lower layer formed in the decanter is a water layer, while the upper layer formed therein is a solvent layer. A part of the solvent layer is discharged from the system while the remaining part as well as the water layer portion is refluxed towards the top of the distillation column.

The bottom liquid forms an absolute or water containing MIBC stream which contains very little or no MO component. This bottom liquid is then discharged from the bottom of the distillation column. When the bottom liquid is an absolute MIBC stream (when employing relatively low ratios of water in a column), it may further be fed into another simple column to eliminate high boiling materials. Very high purity, e.g. 99+% MIBC, is obtained from the second column. On the other hand when the bottom liquid contains substantial amounts of water (high ratio of water is used in the distillation step), water is removed from the bottom stream by an intermediate dehydration step with the effluent of this step then being treated in a similar manner for removal of high boiling substances so as to obtain a highly purified MIBC product.

In order to obtain a relatively absolute MIBC stream from the bottom of the initial aqueous distillation column, it is preferred to operated in the following manner. An amount of water is fed into the column which is equal to the amount of water contained in the solution discharged from the upper layer of the decanter in order to maintain the amount of water in the distillation system substantially constant. Water can be fed into any portion of the column higher than the middle part of the column. In all events the distillation column should be operated in a manner so that water is always present in the upper five or ten plates from the bottom of the column. The top of the column is maintained at a temperature of about 90° C. to 95° C., preferably 92° C. to 93° C. Vapor evaporated from the top of the column typically comprises about 60% water, 15% to 35% MO and 5% to 25% MIBC. The vapor is condensed and is fed into the decanter. The water layer formed in the decanter contains water at a concentration of more than 95% and a solvent layers contains water at a concentration of not more than about 5%. The entire water layer is refluxed towards the top portion of the column while the solvent layer is in part refluxed and in part withdrawn. Generally, the solvent layer is refluxed at a ratio of 0.5:1 to 10:1, with the surplus amount rich in MO component being discharged from the system. The discharged solvent can, if desired, be recycled to the MO hydrogenation step.

The bottom portion of the aqueous distillation column is maintained at a temperature of 130° C. to 140° C., preferably 133° C. to 139° C. The bottom liquid discharged from the column in this embodiment of the present invention contains very little or no MO component, as well as relatively little water. It may contain a small amount of high boiling substances formed during the hydrogenation reaction and thus it may be desirable to remove these high boiling substances from the MIBC recovered thereby. The discharged solution from the bottom of the aqueous distillation step therefore may be fed into a column to eliminate the high boiling substances whereby highly purified MIBC can be obtained as overhead product from the subsequent fractionation column.

When a relatively large amount of water, e.g. more than defined above, is fed to the distillation column, MIBC withdrawn as bottoms from the column can contain additional water. This water is then removed by a dehydration column, with the MIBC rich stream recovered from the dehydration column then being treated in a similar manner to eliminate high boiling substances. It is preferred in general to use no excessive amount of water, e.g. preferably to add 0.25 to 1 parts of water per 100 parts of MIBC and MO charge to the column.

Various aspects and modifications of the present invention will be made more clearly apparent by reference to the following drawing and accompanying examples.

The drawing illustrates both the preferred procedure of utilizing a relatively small amount of water in the dehydration step as well as the alternative of employing a dehydration unit in combination with the basic aqueous distillation step and removal of high boiling substances from the MIBC product stream.

The relationship of the various units shown in the drawing will become more clearly apparent when referring to the following examples:

EXAMPLE 1

With reference to the accompanying drawing, a mixture solution of 5% MO, 94% MIBC and 1% high boiling substance was charged into a distillation column 3 through a feed pipe 1 at a rate of 200 kg./hour onto the 10th plate from the top. Column 3 contained a total of 80 plates. Water was then introduced into the 10th plate from the top through a fed pipe 2 at a rate of one kg./hour. A temperature was maintained at 92° C. to 93° C. at the top of the column 3. It is important to maintain a temperature gradient in the column, e.g. a temperature around the 70th plate of 120° C. to 128° C., and the temperature at the bottom kept at about the boiling temperature of MIBC, namely 131.6° C. Vapor from the top of the column was condensed with a condenser 7 and was fed into a decanter 4 at a rate of 485 kg./hour. The upper layer of decanter 4 had a composition of 47.5% MO, 47.5% MIBC and 5% water. 20.4 kg./hour of the upper layer was discharged through pipe 8, while the residual solution was refluxed towards the top of the column via line 12.

Bottom liquid recovered from the base of column 3 had a composition of 0.17% MO, 98.73% MIBC and 1.1% high-boiling substances. The bottom liquid was discharged at a ratio of 180.4 kg./hour through line 14. High boiling substances in the bottom liquid were removed by column 6 in the manner more fully described in Example 2, by a selective distillation step. There was obtained as overhead of column 6 withdrawn through line 25, a highly purified MIBC having a purity of more than 99.2%, which contained less than 0.2% MO.

EXAMPLE 2

Example 2 illustrates a technique wherein a greater proportion of water is employed in conjunction with a dehydration treatment to give a highly pure MIBC ultimate product.

A mixture of 5% MO, 94% MIBC and 1% high-boiling substances was charged into a distillation column 3 through a feed pipe 1 at a rate of 200 kg./hour. The 10th plate of the 80 plates in total was used as a feeding plate (from the top of the column). Water was fed into the column at the 10th plate from the top through a pipe 2 at a rate of 50 kg./hour. A temperature of 92° to 93° C. was maintained at the top of column 3, while a temperature at the bottom part showed 95° to 99° C. Vapor from the top of column 3 was condensed with a condenser 7 and then introduced into a decanter 4 at a rate of 485 kg./hour. The upper layer of the decanter had a composition of 47.5% MO, 47.5% MIBC and 5% water. 20.6 kg. of the upper layer was discharged from the system through a pipe 8. All remaining solution was refluxed towards the top of the column 3 via lines 11, 12 and 13.

Liquid from the bottom of column 3 was withdrawn by line 14 and then fed into a decanter 9, thereby forming upper and lower layers. The lower layers contained about 98% water and less than 2% MIBC and was discharged from the system through line 16. The upper layer formed a mixture of 0.08% MO, 98.8% MIBC and 1.1% high-boiling substances; and 5% water. The upper layer liquid was fed from the decanter by line 17 into a dehydration column 5 at a rate of about 189 kg./hour. The top part of column 5 was maintained at 94° to 95° C., while the bottom part of column 5 was maintained at 135 to 139° C. Vapor from the top of the column was condensed with a condenser 18 and was then sent to a decanter 10. The residual upper layer solution was refluxed towards the top of the column through line 19. On the other hand, lower layer liquid was discharged from the column by line 20. Bottom liquid recovered from column 5 through conduit 21 had a composition of 0.09% MO, 98.81% MIBC and 1.1% high-boiling substances and was discharged at a rate of 178 kg./hour.

The discharged bottom liquid was then introduced via lines 21 and 22 into column 6 for the elimination of high-boiling substances. Column 6 had a bottom temperature of 154° C. and a top temperature of 131.6° C. After condensing the overhead of column 6 by condenser 23 there was obtained a highly purified MIBC stream via line 25, having a purity of more than 99.4% and including less than 0.1% MO. A portion of the overhead is refluxed via line 24, and high boiling materials removed via line 26.

Having described the present invention that which is sought to be protected by Letters Patent is set forth in the following claims.

What is claimed is:

1. The improved method of recovering methyl-isobutylcarbinol from a mixture of methyl-isobutylcarbinol and mesityl oxide to obtain a stream rich in methyl-isobutylcarbinol which comprises: adding to said mixture 0.25 to 50 weight parts of water per 100 weight parts of mixture of methyl-isobutylcarbinol and mesityl oxide, and distilling said mixture in a distillation zone in the presence of 0.25 to 50 weight parts of water per 100 weight parts of mixture of methyl-isobutylcarbinol and mesityl oxide so as to form an overhead stream rich in mesityl oxide and a bottom stream rich in methyl-isobutylcarbinol.

2. The process of claim 1 wherein the temperature of the upper portion of said distillation zone is at least 90° C.

3. The process of claim 1 wherein the overhead of said distillation zone is condensed and separated into a water rich phase and an organic rich phase, and a portion of the organic rich phase being removed from the system while the entire water rich phase is refluxed to the distillation zone.

4. The process of claim 1 wherein 0.25 to 30 weight parts of water per 100 weight parts of mixture of methyl-isobutylcarbinol and mesityl oxide are fed to said distillation zone.

5. The process of claim 1 wherein 0.25 to 1 weight part of water per 100 weight parts of mixture of methyl-isobutylcarbinol and mesityl oxide are fed to said distillation zone.

6. An improved method of recovering methyl-isobutylcarbinol from a mixture of methyl-isobutylcarbinol and mesityl oxide, which comprises: adding to said mixture 0.25 to 50 parts of water per 100 weight parts of mixture of methyl-isobutylcarbinol and mesityl oxide, and subjecting said mixture to distillation in the presence of said added quantity of water; separating the overhead of said distillation zone into an organic rich phase and a water rich phase; withdrawing a portion of the organic rich phase and recycling the remainder and the water rich phase to said distillation zone; and recovering a bottom from said distillation zone a stream rich in methyl-isobutylcarbinol and substantially free of mesityl oxide.

7. The method of claim 6 wherein the bottoms stream is subjected to further distillation to remove high boiling impurities.

8. The method of claim 6 wherein 0.25 to 1 part of water per 100 parts of mixture is maintained in said distillation zone so that a bottoms methyl isobutylcarbinol product substantially free of mesityl oxide and water is directly recovered from said zone.

9. The method of claim 8 wherein the upper portion of said distillation zone is maintained at a temperature of 92° to 93° C. and bottoms portion at a temperature of 133° to 139° C.

10. The method of claim 6 wherein the ratio of water to mixture is greater than 1 but less than 50 weight parts per 100 weight parts of methyl-isobutylcarbinol and mesityl oxide mixture, and wherein the bottoms stream is subjected to a dehydration step to remove water therefrom.

11. The improved method of separating a mixture of methyl-isobutylcarbinol and mesityl oxide to obtain a stream rich in methyl-isobutylcarbinol which comprises:

(1) distilling said mixture in a distillation zone in the presence of 0.25 to 50 weight parts of water per 100 weight parts of mixture of methyl-isobutylcarbinol and mesityl oxide so as to form an overhead stream rich in mesityl oxide and a bottoms stream rich in methyl-isobutylcarbinol, (2) distilling said bottoms stream to remove high boiling impurities and recovering a high purity methyl-isobutylcarbinol, (3) condensing the overhead stream from said initial distillation zone and separating it into a water rich phase and an organic rich phase, removing a portion of the organic rich phase from the system, and refluxing the water rich phase to the initial distillation step.

References Cited
UNITED STATES PATENTS

| | | | |
|---|---|---|---|
| 1,965,829 | 7/1934 | Guinot | 260—638 |
| 2,827,490 | 3/1958 | Martin | 203—82 |
| 2,874,096 | 2/1959 | Scheeline et al. | 203—85 |

WILBUR L. BASCOMB, JR., *Primary Examiner.*

U.S. Cl. X.R.

203—18, 96; 260—638, 643